US010480303B2

(12) United States Patent
Babcock et al.

(10) Patent No.: US 10,480,303 B2
(45) Date of Patent: Nov. 19, 2019

(54) SYSTEMS AND METHODS FOR RECOVERING AN UNFRACTIONATED HYDROCARBON LIQUID MIXTURE

(71) Applicants: Linde Aktiengesellschaft, Munich (DE); John A. Babcock, Houston, TX (US)

(72) Inventors: John A. Babcock, Houston, TX (US); Charles P. Siess, III, Conroe, TX (US)

(73) Assignee: Linde Aktiengesellschaft, Munich (DE)

( * ) Notice: Subject to any disclaimer, the term of this patent is extended or adjusted under 35 U.S.C. 154(b) by 256 days.

(21) Appl. No.: 15/356,850

(22) Filed: Nov. 21, 2016

(65) Prior Publication Data
US 2017/0218743 A1    Aug. 3, 2017

Related U.S. Application Data

(60) Provisional application No. 62/289,722, filed on Feb. 1, 2016, provisional application No. 62/319,877, filed on Apr. 8, 2016.

(51) Int. Cl.
| | |
|---|---|
| *E21B 43/34* | (2006.01) |
| *E21B 43/40* | (2006.01) |
| *B01D 19/00* | (2006.01) |
| *B01D 17/02* | (2006.01) |

(52) U.S. Cl.
CPC .......... *E21B 43/34* (2013.01); *B01D 17/0208* (2013.01); *B01D 19/0036* (2013.01); *B01D 19/0068* (2013.01); *E21B 43/40* (2013.01)

(58) Field of Classification Search
CPC ......... E21B 43/34; E21B 43/40; E21B 21/063
See application file for complete search history.

(56) References Cited

U.S. PATENT DOCUMENTS

| | | | |
|---|---|---|---|
| 2,423,374 A | * | 7/1947 | Chaney ................... C10G 9/26 422/201 |
| 3,035,637 A | | 5/1962 | Allen |
| 3,316,965 A | | 5/1967 | Watanabe |
| 3,319,712 A | | 5/1967 | O'Brien |
| 3,368,627 A | | 2/1968 | Hurst et al. |
| 4,490,985 A | | 1/1985 | Wells |
| 4,511,381 A | | 4/1985 | Mehra |

(Continued)

FOREIGN PATENT DOCUMENTS

| | | |
|---|---|---|
| DE | 102014010105 A1 | 1/2016 |
| FR | 2466606 A1 | 4/1981 |

(Continued)

OTHER PUBLICATIONS

Rassenfoss; "In Search of the waterless fracture", JPT, Jun. 30, 2013, pp. 46-54, XP055237780.

(Continued)

*Primary Examiner* — Catherine Loikith
(74) *Attorney, Agent, or Firm* — Patterson + Sheridan, LLP (57) ABSTRACT

A fluid recovery system includes a separator configured to separate a hydrocarbon stream into L-Grade, water, and natural gas. The system further includes a storage vessel in communication with the separator and configured to store the L-Grade separated from the hydrocarbon stream. The system further includes a compressor in communication with the separator and configured to pressurize the natural gas.

13 Claims, 4 Drawing Sheets

(56) References Cited

U.S. PATENT DOCUMENTS

| | | | |
|---|---|---|---|
| 4,576,005 A | | 3/1986 | Force |
| 4,617,030 A | * | 10/1986 | Heath ................. E21B 43/34 |
| | | | 95/158 |
| 6,230,814 B1 | | 5/2001 | Nasr et al. |
| 6,347,675 B1 | * | 2/2002 | Kolle ..................... C09K 8/38 |
| | | | 175/205 |
| 7,373,790 B2 | | 5/2008 | Clare et al. |
| 8,505,332 B1 | | 8/2013 | Prim |
| 8,844,639 B2 | | 9/2014 | Gupta et al. |
| 8,869,889 B2 | | 10/2014 | Palmer et al. |
| 9,488,040 B2 | | 11/2016 | Chakrabarty et al. |
| 9,534,836 B2 | | 1/2017 | Dubettier-Grenier et al. |
| 2003/0056535 A1 | * | 3/2003 | Beam ..................... F17C 7/00 |
| | | | 62/613 |
| 2005/0189112 A1 | | 9/2005 | Taylor et al. |
| 2006/0289166 A1 | | 12/2006 | Stromquist et al. |
| 2007/0000666 A1 | | 1/2007 | Vozniak et al. |
| 2007/0187340 A1 | | 8/2007 | Oresti et al. |
| 2008/0047705 A1 | * | 2/2008 | Vaello ................. E21B 43/126 |
| | | | 166/250.15 |
| 2008/0087041 A1 | | 4/2008 | Denton et al. |
| 2012/0000660 A1 | | 1/2012 | Gatlin et al. |
| 2012/0047942 A1 | | 3/2012 | Kolodziej |
| 2013/0168086 A1 | | 7/2013 | Roberts |
| 2013/0213085 A1 | | 8/2013 | Ward |
| 2013/0220605 A1 | | 8/2013 | Vandor |
| 2013/0228330 A1 | | 9/2013 | Loree et al. |
| 2013/0299167 A1 | | 11/2013 | Fordyce et al. |
| 2014/0000899 A1 | | 1/2014 | Nevison |
| 2014/0124208 A1 | | 5/2014 | Loree et al. |
| 2014/0366577 A1 | | 12/2014 | Zubrin et al. |
| 2015/0021022 A1 | | 1/2015 | Ladva et al. |
| 2015/0152318 A1 | | 6/2015 | Travis |
| 2015/0167550 A1 | | 6/2015 | Vandervort et al. |
| 2015/0184932 A1 | | 7/2015 | Higginbotham et al. |
| 2015/0233222 A1 | | 8/2015 | Teklu et al. |
| 2015/0368566 A1 | | 12/2015 | Young et al. |
| 2017/0218742 A1 | * | 8/2017 | Babcock ................ E21B 43/34 |

FOREIGN PATENT DOCUMENTS

| | | |
|---|---|---|
| GB | 2219818 A | 12/1989 |
| WO | 2010025540 A1 | 3/2010 |
| WO | 2012097424 A1 | 7/2012 |
| WO | 2015020654 A1 | 2/2015 |
| WO | 2016064645 A1 | 4/2016 |

OTHER PUBLICATIONS

M. Asadi et al., "Water-Free Fracturing: A Case History", Society of Petroleum Engineers, SPE-175988-MS, 14 Pages.

Pazuki et al., "A modified Flory-Huggins model for prediction of asphaltenes precipitation in crude oil", Fuel, IPC Science and Technology Press, Guildford, GB, vol. 85, No. 7-8, pp. 1083-1086, May 1, 2016.

Nakashima et al., "SPE-177801-MS Development of a Giant Carbonate Oil Field, Part 2: Mitigation from Pressure Maintenance Developement to Sweep Oriented IOR Development", https://www.onepetro.org/download/conference-paper/SPE-177801-MS?id=conference-paper/SPE-177801-MS, pp. 1-8 and 12-16, Jan. 1, 2015.

Qing Sun et al., "Quantification of uncertainty in recovery efficiency predictions: lessons learned from 250 mature carbonate fields", SPE 84459, pp. 1-15, Jan. 1, 2005.

Holtz et al., "Summary Integrated Geologic and Engineering Determination of Oil-Reserve-Growth Potential in Carbonate Reservoirs", https://www.onepetro.org/download/journal-paper/SPE-22900-PA?id=journal-paper/SPE-22900-PA, p. 1250 and 1253, Jan. 1, 1992.

Ginley, "Osudo Reservoir Fluid Study Jordan B No. 1 Well", http://ocdimage.emnrd.state.nm.us/imaging/filestore/SantaFeAdmin/CF/ADA-03-00539 Case Files Part 6/10796_4159.pdf, pp. 1,5; table 2, Jan. 1, 1992.

International Invitation to Pay Additional Fees and, Where Applicable, Protest Fee dated Feb. 13, 2017, Corresponding to Application No. PCT/US2016/063132.

International Search Report and Written Opinion dated May 10, 2017, corresponding to Application No. PCT/US2016/063127.

International Search Report and Written Opinion dated May 10, 2017, corresponding to Application No. PCT/US2016/063132.

* cited by examiner

SYSTEMS AND METHODS FOR RECOVERING AN UNFRACTIONATED HYDROCARBON LIQUID MIXTURE

CROSS REFERENCE TO RELATED APPLICATIONS

This application claims benefit of U.S. Provisional Patent Application Ser. No. 62/289,722, filed Feb. 1, 2016, and U.S. Provisional Patent Application Ser. No. 62/319,877 filed Apr. 8, 2016, the contents of which are herein incorporated by reference in their entirety.

BACKGROUND

Field

Embodiments of this disclosure generally relate to a recovery system for L-Grade.

Description of the Related Art

Hydraulic fracture treatments are utilized to stimulate and improve fluid conductivity between a wellbore and a formation of interest to increase fluid production rate and associated reserves. Recent data suggests that approximately 98% of the hydraulic fracture treatments in the U.S. utilize water-based stimulation fluids (also referred to as fracing fluids). Water-based fracing fluids have associated acquisition, disposal, clean-up, and usage issues that can damage the formation and require chemical additions. Massive hydraulic fracture treatments traditionally use 100,000 barrels of water or more.

Therefore, there is a need for new stimulation fluids that are non-damaging to the formation, have minimal water content and chemical additions, are naturally occurring with locally available components, have fast clean-up, are cost effective, and are totally recoverable with minimal proppant flow back.

SUMMARY

In one embodiment, a fluid recovery system comprises a separator configured to separate a hydrocarbon stream into an unfractionated mixture, water, and natural gas, wherein the unfractionated mixture comprises ethane, propane, butane, isobutane, and pentane plus; a storage vessel in communication with the separator and configured to store the unfractionated mixture separated from the hydrocarbon stream; and a compressor in communication with the separator and configured to pressurize the natural gas.

In one embodiment, a method of recovering a fluid comprises transporting a recovery system to a wellsite; connecting the recovery system to a hydrocarbon stream produced from the wellsite; and separating an unfractionated mixture from the hydrocarbon stream at the wellsite, wherein the unfractionated mixture comprises ethane, propane, butane, isobutane, pentane plus, and condensate.

In one embodiment, a method of recovering a fluid comprises receiving a hydrocarbon stream from one or more wells at a wellsite; separating an unfractionated mixture from the hydrocarbon stream at the wellsite, wherein the unfractionated mixture comprises ethane, propane, butane, isobutane, pentane plus, and condensate; and storing the unfractionated mixture at the wellsite.

BRIEF DESCRIPTION OF THE DRAWING

So that the manner in which the above recited features can be understood in detail, a more particular description of the embodiments briefly summarized above may be had by reference to the embodiment below, some of which are illustrated in the appended drawing. It is to be noted, however, that the appended drawing illustrate only typical embodiments and are therefore not to be considered limiting of its scope, for the embodiments may admit to other equally effective embodiments.

DETAILED DESCRIPTION

L-Grade is an unfractionated hydrocarbon mixture comprising natural gas liquids, condensate (including aromatics), and traces of water, carbon dioxide, and/or hydrogen sulfide. The natural gas liquids in the L-Grade mixture comprise ethane, propane, butane, isobutane, and pentane plus. Pentane plus comprises pentane, isopentane, and/or heavier weight hydrocarbons, for example hydrocarbon compounds containing C5 through C35. Pentane plus may include natural gasoline for example.

Typically, L-Grade is a by-product of de-methanized hydrocarbon streams that are produced from shale wells and transported to a centralized facility. L-Grade typically includes natural gas liquids and condensate with an API gravity ranging between 50 degrees and 75 degrees. In its un-fractionated or natural state (under certain pressures and temperatures, for example within a range of 250-600 psig and at wellhead or ambient temperature) L-Grade has no dedicated market or known use. L-Grade must undergo processing before its true value is proven.

The L-Grade composition can be customized for handling as a liquid under various conditions. Since the ethane content of L-Grade affects the vapor pressure, the ethane content can be adjusted as necessary. According to one example, L-Grade may be processed to have a low ethane content, such as an ethane content within a range of 3-12 percent, to allow the L-Grade to be transported as a liquid in low pressure storage vessels. According to another example, L-Grade may be processed to have a high ethane content, such as an ethane content within a range of 38-60 percent, to allow the L-Grade to be transported as a liquid in high pressure pipelines.

L-Grade differs from liquefied petroleum gas ("LPG"). One difference is that LPG is a fractionated product comprised of primarily propane, or a mixture of fractionated products comprising propane and butane. Another difference is that LPG is a fractioned hydrocarbon mixture, whereas L-Grade is an unfractionated hydrocarbon mixture. Another difference is that LPG is produced in a fractionation facility, whereas L-Grade can be obtained from an operator's oil & gas production facility. A further difference is that LPG is a pure product with the exact same composition, whereas L-Grade can have a variable composition.

L-Grade can be recovered from a hydrocarbon stream that is collected from the wellhead or production header of one or more unconventional resource wells, typically referred to as shale wells, via flash separation at pressures that are typically below 600 psig. This is accomplished by utilizing flash separation operated at low enough pressure to reject the vast majority of methane from the hydrocarbon stream, but at high enough pressure to retain a significant portion of the ethane plus mixture.

A mobile high pressure separation and compression system (such as recovery systems 1000, 2000, 3000, 4000 shown in FIG. 1-4) can be utilized to recover L-Grade from an individual well or a comingled hydrocarbon stream from several unconventional wells located on a common pad at a wellsite of an oil and gas lease. It is economically attractive to recover and to use the L-Grade from the same oil and gas lease as it eliminates the requirements for the operator to pay mineral royalties and state taxes in most states.

The high pressure mobile separation and compression system is comprised of a three-phase horizontal separator and one or more compressors (such as a natural gas compressor). The three-phase horizontal separator is operated at a specific pressure and temperature to recover a unique composition of L-Grade that can be stored, transported under pressure, and utilized as a stimulation fluid, such as a hydraulic fracturing fluid and/or an enhanced oil recovery fluid. The compressor is utilized to re-pressurize the residual natural gas stream from the three-phase horizontal separator to satisfy offtake wet gas sales pipeline requirements.

Figure 1:
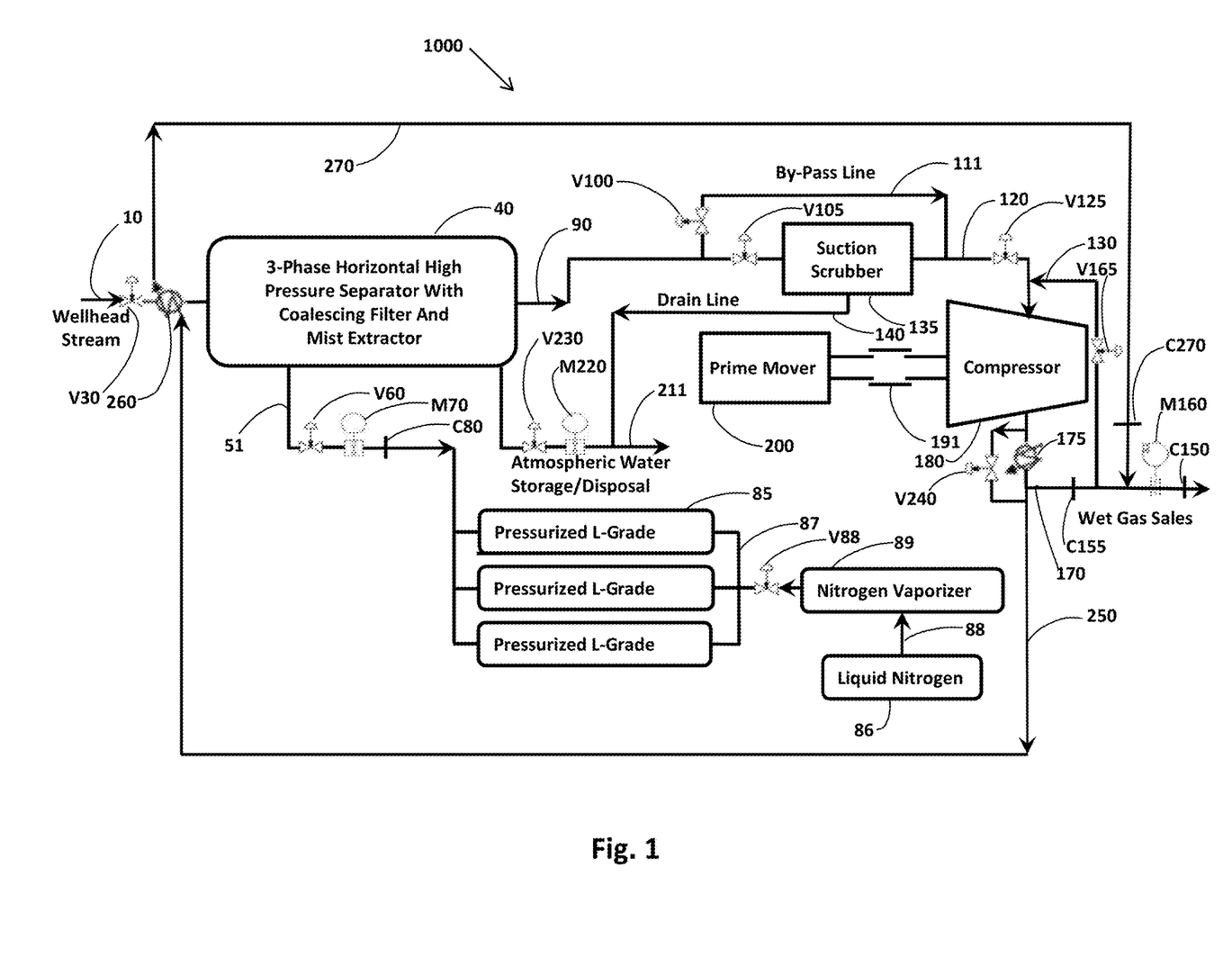
FIG. 1 shows a plan schematic of a mobile L-Grade recovery system according to one embodiment.

FIG. 1 shows a plan schematic of a mobile L-Grade recovery system 1000 according to one embodiment that can be used to create and recover L-Grade from a wellhead hydrocarbon stream 10 at a wellsite. The L-Grade recovery system 1000 is transported to the wellsite and connected to the hydrocarbon stream 10 (produced from one or more wells at the wellsite) via an inlet of a three-phase high pressure horizontal separator 40 with operating pressure and throughput rate controlled by control valve V30. The hydrocarbon stream 10 may flow through a cooler 260 prior to entering the separator 40, which provides thermal contact between the hydrocarbon stream 10 and a cooled, pressurized natural gas stream that is extracted from the hydrocarbon stream 10 as further described below. The hydrocarbon stream 10 is separated by the separator 40 into three unique components including L-Grade, water, and natural gas via gravity segregation at a specified pressure and temperature.

Pressurized L-Grade exits the separator 40 via transfer line 51 that is controlled by control valve V60 and rate metered by turbine meter M70 to pressurized L-Grade storage vessels 85. Check valve C80 prevents back flow from the L-Grade storage vessels 85. The L-Grade storage vessels 85 are nitrogen blanketed by a nitrogen blanketing system comprising a nitrogen header 87, control valve V88, and liquid nitrogen storage tank 86. Liquid nitrogen from the storage tank 86 via line 88 is vaporized in a nitrogen vaporizer 89 and discharged through the control valve V88 to the nitrogen header 87, which distributes nitrogen into the L-Grade storage vessels 85. The L-Grade can subsequently be used as a stimulation fluid in the form of a foam, a gel, and/or an emulsion, and injected into a hydrocarbon-bearing reservoir (such as through the same well that the hydrocarbon stream 10 was produced) to stimulate and/or fracture the reservoir.

Water from separator 40 is transferred via line 211 to an atmospheric water storage and/or disposal facility on the oil and gas leases for example. The flow rate and pressure of the water from the separator 40 is controlled by control valve V230 and metered by turbine meter M220.

Natural gas from the separator 40 is transferred via line 90 through control valve V105 and into a suction scrubber 135. Entrained liquids are removed from the natural gas stream by the suction scrubber 135 and transferred to the atmospheric water storage and/or disposal facility via drain line 140. The suction scrubber 135 can be by-passed by opening control valve V100, closing control valve V105, and allowing the natural gas stream to move through line 111.

A liquid free natural gas stream exits the suction scrubber 135 via line 120, flows through control valve V125, and is suctioned into a compressor 180. Although only one compressor 180 is shown, the L-Grade recovery system 1000 may include two or more compressors 180.

The compressor 180 is driven by a prime mover 200 via a power transfer coupling 191 to pressurize the natural gas stream. The high pressure natural gas stream exits the compressor 180, is cooled by an aftercooler 175, flows through check valve C155, and is metered by an orifice meter M160 before transferring to a wet gas sales line (which may also have check valve C150) via transfer line 170. The high pressure natural gas stream flowing through the transfer line 170 may be cycled back through the compressor 180 by opening control valve V165 to line 130, which directs the high pressure natural gas stream back to line 120 upstream of the compressor 180.

The pressurized natural gas stream leaving the compressor 180 may be cooled by the aftercooler 175 and routed to the cooler 260, as mentioned above, to cool the hydrocarbon stream 10. The cooler 260 cools the hydrocarbon stream 10 for separation in the separator 40 and heats the pressurized natural gas stream flowing through line 250. The pressurized natural gas stream is then routed through line 270 back to the wet gas sales line via transfer line 170, typically downstream of the line 130. Alternatively, the pressurized natural gas stream in line 270 may join transfer line 170 between the check valve C155 and the line 130 in some cases.

The total flow of natural gas from line 270 and natural gas directly from the compressor 180 in line 170 is metered by orifice meter M160, and back flow is prevented by check valves C155 and C150. If desired, the aftercooler 175 may be partially bypassed by opening control valve V240, so that cooling of the hydrocarbon stream 10 may be controlled by adjusting the temperature of the pressurized natural gas stream in line 250.

Figure 2:
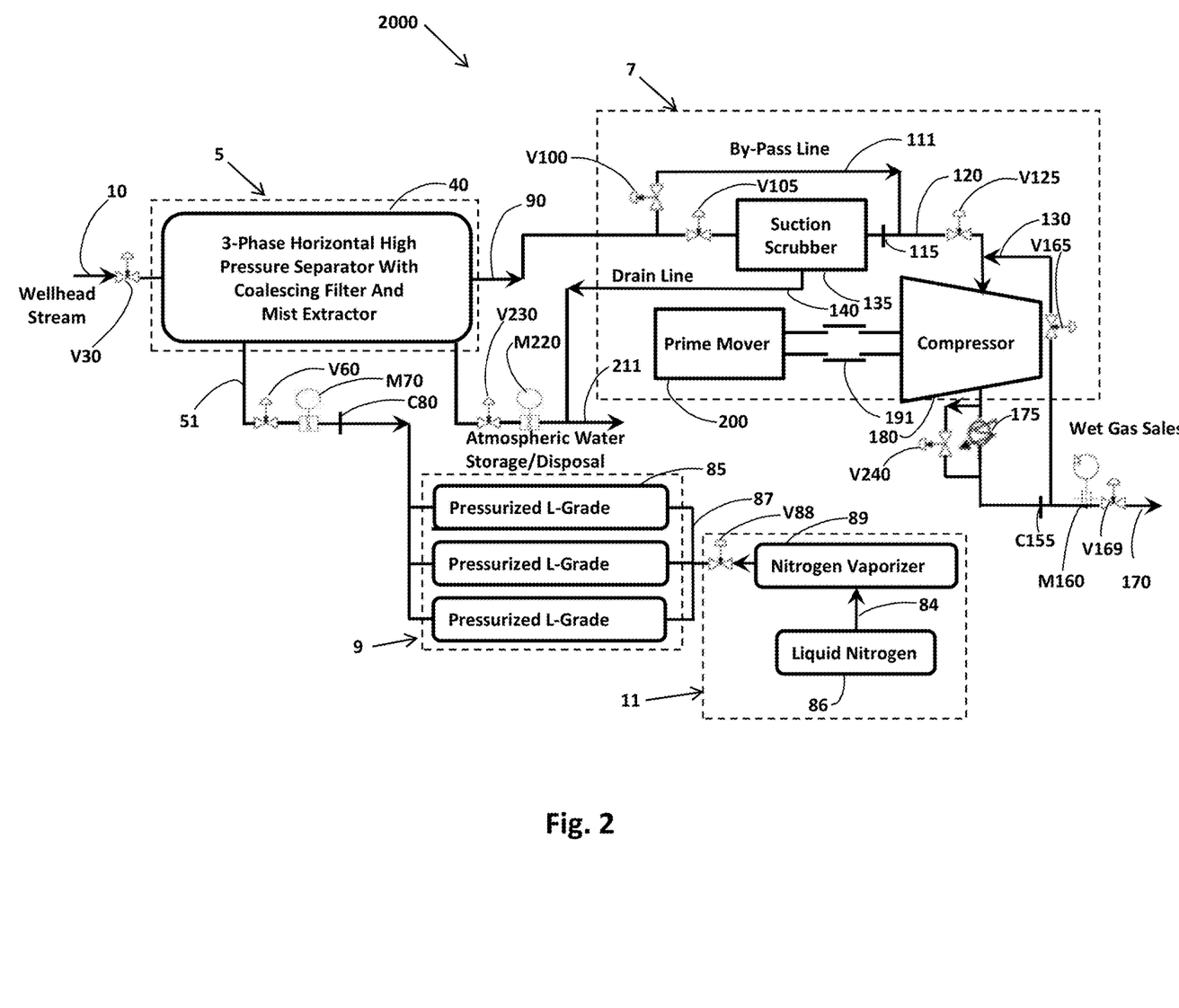
FIG. 2 shows a plan schematic of another mobile L-Grade recovery system according to one embodiment.

FIG. 2 shows a plan schematic of a mobile L-Grade recovery system 2000 according to one embodiment that can be used to create and recover L-Grade from a wellhead hydrocarbon stream 10 at a wellsite. The L-Grade recovery system 2000 is transported to the wellsite and connected to the hydrocarbon stream 10 (produced from one or more wells at the wellsite) via an inlet of a three-phase high pressure horizontal separator 40 with operating pressure and throughput rate controlled by control valve V30. The hydrocarbon stream 10 is separated by the separator 40 into three unique components including L-Grade, water, and natural gas via gravity segregation at a specified pressure.

Pressurized L-Grade exits the separator 40 via transfer line 51 that is controlled by control valve V60 and rate metered by turbine meter M70 to pressurized L-Grade storage vessels 85. Check valve C80 prevents back flow from the L-Grade storage vessels 85. The L-Grade storage vessels 85 are nitrogen blanketed by a nitrogen blanketing system comprising a nitrogen header 87, control valve V88, and liquid nitrogen storage tank 86. Liquid nitrogen from the storage tank 86 via line 84 is vaporized in a nitrogen vaporizer 89 and discharged through the control valve V88 to the nitrogen header 87, which distributes nitrogen into the L-Grade storage vessels 85. The L-Grade can subsequently be used as a stimulation fluid in the form of a foam, a gel, and/or an emulsion, and injected into a hydrocarbon-bearing reservoir (such as through the same well that the hydrocarbon stream 10 was produced) to stimulate and/or fracture the reservoir.

Water from separator 40 is transferred via line 211 to an atmospheric water storage and/or disposal facility on the oil and gas leases for example. The flow rate and pressure of the water from the separator 40 is controlled by control valve V230 and metered by turbine meter M220.

Natural gas from the separator 40 is transferred via line 90 through control valve V105 and into a suction scrubber 135. Entrained liquids are removed from the natural gas stream by the suction scrubber 135 and transferred to the atmospheric water storage and/or disposal facility via drain line 140. The suction scrubber 135 can be by-passed by opening control valve V100, closing control valve V105, and allowing the natural gas stream to move through line 111.

A liquid free natural gas stream exits the suction scrubber 135 via line 120, flows through check valve 115 and control valve V125, and is suctioned into a compressor 180 (such as a natural gas compressor). Although only one compressor 180 is shown, the L-Grade recovery system 2000 may include two or more compressors 180 in series.

The compressor 180 is driven by a prime mover 200 via a power transfer coupling 191 to pressurize the natural gas stream. The high pressure natural gas stream exits the compressor 180, is cooled by an aftercooler 175, flows through check valve C155, and is metered by an orifice meter M160 before transferring to a wet gas sales line (which may also have a control valve V169) via transfer line 170. If desired, the aftercooler 175 may be partially bypassed by opening control valve V240. The pressurized natural gas stream can also be cycled back through the compressor 180 by opening control valve V165 and closing control valve V169 to cycle the pressurized natural gas stream back into line 120 upstream of the compressor 180.

Figure 3:
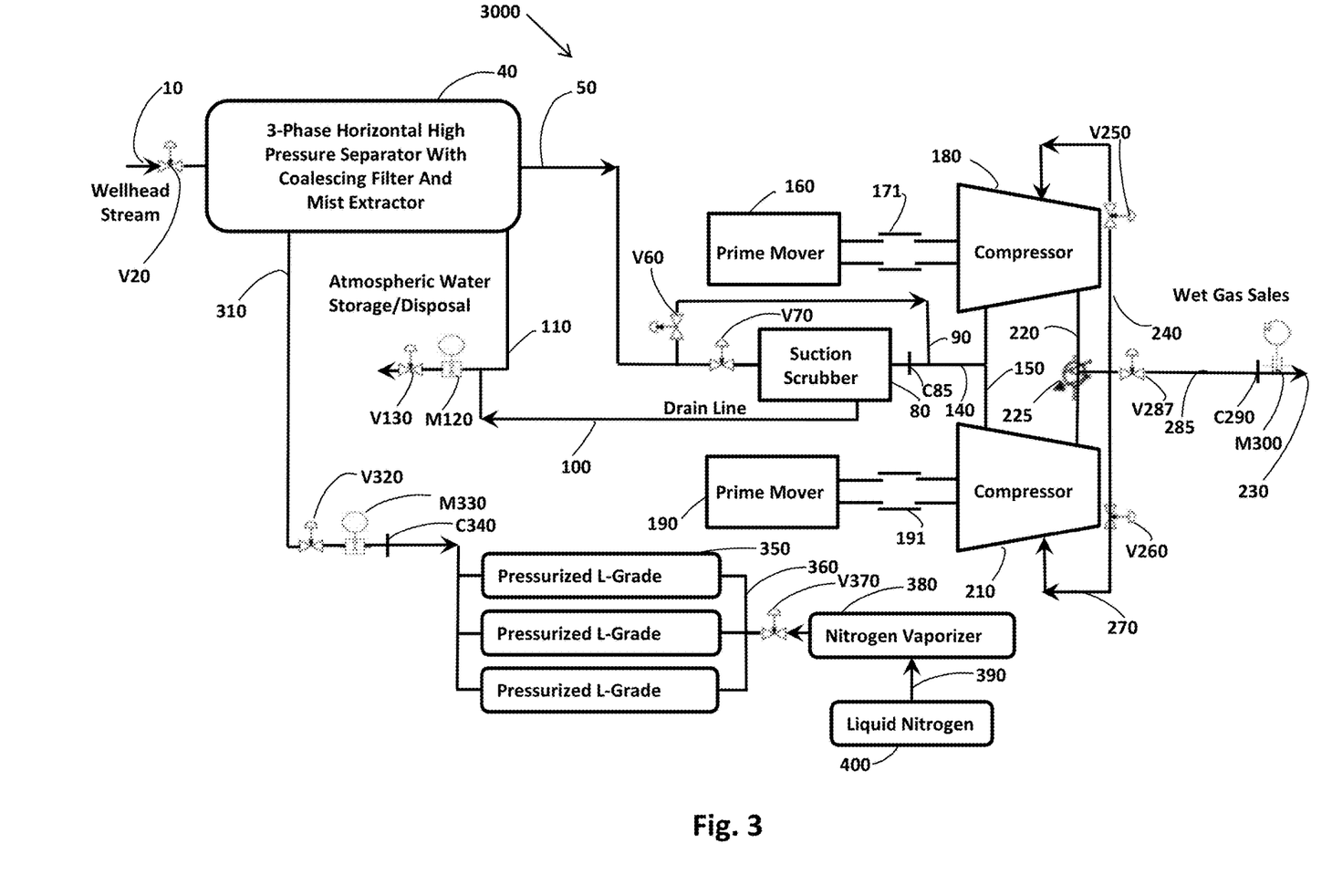
FIG. 3 shows a plan schematic of another mobile L-Grade recovery system according to one embodiment.

FIG. 3 shows a plan schematic of a mobile L-Grade recovery system 3000 according to one embodiment that can be used to create and recover L-Grade from a wellhead hydrocarbon stream 10 at a wellsite. The L-Grade recovery system 3000 is transported to the wellsite and connected to the hydrocarbon stream 10 (produced from one or more wells at the wellsite) via an inlet of a three-phase high pressure horizontal separator 40 with operating pressure and throughput rate controlled by control valve V20. The hydrocarbon stream 10 is separated by the separator 40 into three unique components including L-Grade, water, and natural gas via gravity segregation at a specified pressure.

Pressurized L-Grade exits the separator 40 via transfer line 310 that is controlled by control valve V320 and rate metered by turbine meter M330 to pressurized L-Grade storage vessels 350. Check valve C340 prevents back flow from the L-Grade storage vessels 350. The L-Grade storage vessels 350 are nitrogen blanketed by a nitrogen blanketing system comprising a nitrogen header 360, control valve V370, and liquid nitrogen storage tank 400. Liquid nitrogen from the storage tank 400 via line 390 is vaporized in a nitrogen vaporizer 380 and discharged through the control valve V370 to the nitrogen header 360, which distributes nitrogen into the L-Grade storage vessels 350. The L-Grade can subsequently be used as a stimulation fluid in the form of a foam, a gel, and/or an emulsion, and injected into a hydrocarbon-bearing reservoir (such as through the same well that the hydrocarbon stream 10 was produced) to stimulate and/or fracture the reservoir.

Water from separator 40 is transferred via line 110 to an atmospheric water storage and/or disposal facility on the oil and gas leases for example. The flow rate and pressure of the water from the separator 40 is controlled by control valve V130 and metered by turbine meter M120.

Natural gas from the separator 40 is transferred via line 50 through control valve V70 and into a suction scrubber 80. Entrained liquids are removed from the natural gas stream by the suction scrubber 80 and transferred to the atmospheric water storage and/or disposal facility via drain line 100. The suction scrubber 80 can be by-passed by opening control valve V60, closing control valve V70, and allowing the natural gas stream to move through line 90.

A liquid free natural gas stream exits the suction scrubber 80 via line 140, flows through check valve C85, and is suctioned into a suction header 150 for distribution to natural gas compressors 180, 210. The compressors 180, 210 are driven by prime movers 160, 190 via power transfer couplings 171, 191, respectively, to pressurize the natural gas streams. The high pressure natural gas streams exit the compressors 180, 210 into a discharge header 220, and then are cooled by an aftercooler 225, flowed through check valve C290, and metered by an orifice meter M300 before transferring to a wet gas sales line 230 via transfer line 285. The pressurized natural gas stream can also be recycled by opening control valves V250, V260 and at least partially closing control valve V287 to cycle the pressurized natural gas stream back into the compressors 180, 210 via lines 240, 270.

Figure 4:
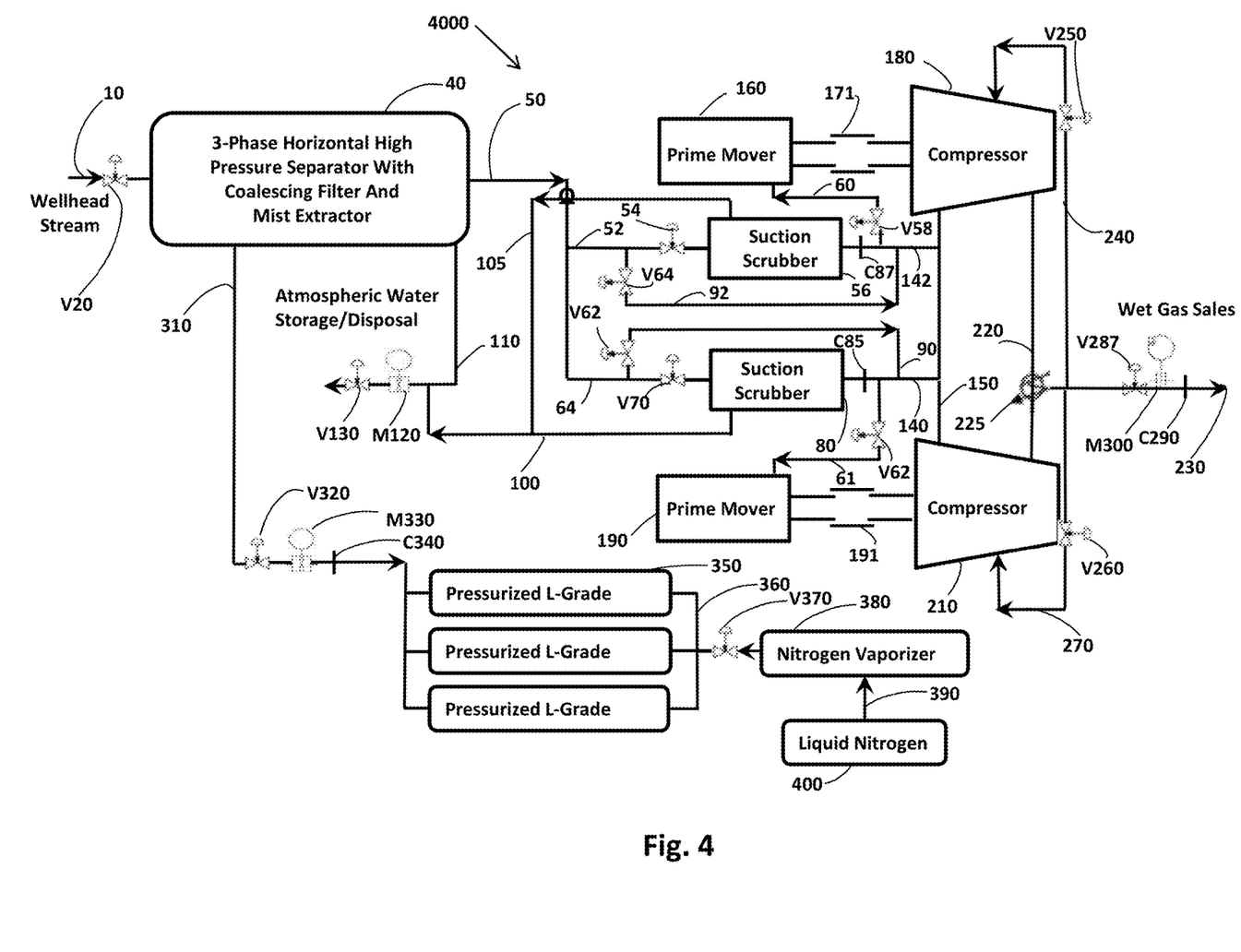
FIG. 4 shows a plan schematic of another mobile L-Grade recovery system according to one embodiment.

FIG. 4 shows a plan schematic of a mobile L-Grade recovery system 4000 according to one embodiment that can be used to create and recover L-Grade from a wellhead hydrocarbon stream 10 at a wellsite. The L-Grade recovery system 4000 is transported to the wellsite and connected to the hydrocarbon stream 10 (produced from one or more wells at the wellsite) via an inlet of a three-phase high pressure horizontal separator 40 with operating pressure and throughput rate controlled by control valve V20. The hydrocarbon stream 10 is separated by the separator 40 into three unique components including L-Grade, water, and natural gas via gravity segregation at a specified pressure.

Pressurized L-Grade exits the separator 40 via transfer line 310 that is controlled by control valve V320 and rate metered by turbine meter M330 to pressurized L-Grade storage vessels 350. Check valve C340 prevents back flow from the L-Grade storage vessels 350. The L-Grade storage vessels 350 are nitrogen blanketed by a nitrogen blanketing system comprising a nitrogen header 360, control valve V370, and liquid nitrogen storage tank 400. Liquid nitrogen from the storage tank 400 via line 390 is vaporized in a nitrogen vaporizer 380 and discharged through the control valve V370 to the nitrogen header 360, which distributes nitrogen into the L-Grade storage vessels 350. The L-Grade can subsequently be used as a stimulation fluid in the form of a foam, a gel, and/or an emulsion, and injected into a hydrocarbon-bearing reservoir (such as through the same well that the hydrocarbon stream 10 was produced) to stimulate and/or fracture the reservoir.

Water from separator 40 is transferred via line 110 to an atmospheric water storage and/or disposal facility on the oil and gas leases for example. The flow rate and pressure of the water from the separator 40 is controlled by control valve V130 and metered by turbine meter M120.

Natural gas from the separator 40 is transferred via line 50 into lines 52, 64 that are controlled by control valves V54, V70 and into suction scrubbers 56, 80. Entrained liquids are removed from the natural gas streams by the suction scrubbers 56, 80 and transferred to the atmospheric water storage and/or disposal facility via drain lines 100, 105. The suction scrubbers 56, 80 can be by-passed by opening control valves V62, V64, closing control valves V70, V54, and allowing the natural gas streams to move through lines 90, 92.

A liquid free natural gas stream exits the suction scrubbers 56, 80 via lines 140, 142, flows through check valve C85, C87, and suctioned into a suction header 150 for distribution to compressors 180, 210. The compressors 180, 210 are driven by prime movers 160, 190 via power transfer couplings 171, 191, respectively, to pressurize the natural gas streams. The prime movers 160, 190 may be natural gas engines that are fueled by natural gas delivered from the suction scrubbers 56, 80 via lines 60, 61 that are controlled by valves V58, V62.

The high pressure natural gas streams exit the compressors 180, 210 into a discharge header 220, and then are cooled by an aftercooler 225, flowed through check valve C290, and metered by an orifice meter M300 before transferring to a wet gas sales line 230 via transfer line 285. The pressurized natural gas stream can also be recycled by opening control valves V250, V260 and at least partially closing control valve V287 to cycle the pressurized natural gas stream back into the compressors 180, 210 via lines 240, 270.

In one embodiment, the mobile L-Grade recovery systems 1000, 2000, 3000, 4000 can be connected to an individual unconventional well or multi-well production facility on an oil and gas lease and located in a designated area classified as Class 1 Division 1 or Division 2 to recover L-Grade and to store the L-Grade for later use in hydraulic fracturing operations.

In one embodiment, the mobile L-Grade recovery systems 1000, 2000, 3000, 4000 and/or the three-phase horizontal high pressure separator 40 is attached to a portable skid-frame (such as portable skid-frame 5 shown in FIG. 2). An example of the separator 40 is a forty inch diameter by ten foot in length carbon steel vessel with a maximum working pressure of 1,440 psig and a liquid and gas capacity of 10,000 barrels of fluid per day and 45 million of cubic feet per day of natural gas, respectively. The inlet of the separator 40 is four inches, the L-Grade outlet of the separator 40 is three inches, the water outlet of the separator 40 is two inches, and the natural gas stream outlet of the separator 40 is three inches, all with ANSI 600 rating. The separator 40 is fitted with a deflector, weir, coalescing plates/filters, a mist extractor, and other safety devices.

In one embodiment, the mobile L-Grade recovery systems 1000, 2000, 3000, 4000 and/or the compressor(s) 180, 210 driven by the prime mover(s) 160, 190, 200 are attached to a portable skid-frame (such as portable skid-frame 7 shown in FIG. 2). An example of the compressors 180, 210 and the prime movers 160, 190, 200 are a reciprocating compressor (or a centrifugal compressor) driven by an electric motor, respectively. A gas turbine powered by the wet gas sales stream can be used to power the prime movers 160, 190, 200. The prime movers 160, 190, 200 can also comprise natural gas fueled engines. The compressors 180, 210 are typically equipped with a suction scrubber, an anti-surge loop, a throttle valve, a shutdown, a speed control, and other safety systems. The typical suction pressure of the compressors 180, 210 would range between 100-230 psig to 250-500 psig, while the typical discharge pressure of the compressors 180, 210 would range between 600 psig to 1,000 psig or 1,500 psig.

In one embodiment, the mobile L-Grade recovery systems 1000, 2000, 3000, 4000 and/or the suction scrubber(s) 56, 80, 135 is attached to a portable skid-frame (such as portable skid-frame 7 shown in FIG. 2). The suction scrubbers 56, 80, 135 are configured to remove entrained liquids and solids from the natural gas stream (that exits from the separator 40) and is typically equipped with replaceable filter elements.

In one embodiment, the mobile L-Grade recovery systems 1000, 2000, 3000, 4000 and/or the L-Grade storage vessel(s) 85, 350 are attached to a portable skid-frame (such as portable skid-frame 9 shown in FIG. 2). An example of an L-Grade storage vessel 85, 350 is a carbon steel bullet shaped shell with a capacity of 30,000-100,000 gallons rated to a maximum working pressure of 250-500 psig equipped with ANSI 600 fittings.

In one embodiment, the mobile L-Grade recovery systems 1000, 2000, 3000, 4000 and/or the nitrogen blanketing system is attached to a portable skid-frame (such as portable skid-frame 11 shown in FIG. 2). The nitrogen blanketing system can inject liquid nitrogen into the L-Grade storage vessels 85, 350. In one embodiment, the L-Grade in the storage vessels 85, 350 can be injected into a reservoir (through the same or a different well from which the hydrocarbon stream 10 was produced, as well as into the same or a different reservoir from which the hydrocarbon stream 10 was produced) to conduct a stimulation operation on the reservoir, such as a fracturing or enhanced oil recovery operation.

In one embodiment, one or more components of the L-Grade recovery systems 1000, 2000, 3000, 4000 or the entire L-Grade recovery systems 1000, 2000, 3000, 4000 can be affixed to a portable skid-frame and transported to a wellsite. In one embodiment, different portions of the L-Grade recovery systems 1000, 2000, 3000, 4000 can be affixed to portable skid-frames (such as skid-frames 5, 7, 9, 11 shown in FIG. 2), transported to a wellsite, and flanged together at the wellsite to form the entire L-Grade recovery system 1000, 2000, 3000, 4000. Although described as mobile L-Grade recovery systems 1000, 2000, 3000, 4000, one or more components of the systems 1000, 2000, 3000, 4000 (or the entire systems 1000, 2000, 3000, 4000) may be permanently affixed at a wellsite. In one embodiment, one or more components of the L-Grade recovery systems 1000, 2000, 3000, 4000 can be remotely monitored during operation to monitor system performance.

The invention claimed is:

1. A method of recovering a fluid, comprising:
transporting a recovery system to a wellsite;
connecting the recovery system to a wellhead at the wellsite;
recovering a hydrocarbon stream from a hydrocarbon bearing reservoir via the wellhead, wherein the hydrocarbon stream has not been previously injected into the hydrocarbon bearing reservoir;
separating natural gas from the hydrocarbon stream at the wellsite; and
separating an unfractionated hydrocarbon liquid mixture from the hydrocarbon stream at the wellsite, wherein the unfractionated hydrocarbon liquid mixture is a by-product of the hydrocarbon stream from which the natural gas has been separated and comprises ethane, propane, butane, isobutane, pentane plus, and condensate, and wherein the hydrocarbon stream further comprises of at least one of condensate, water, carbon dioxide, and hydrogen sulfide.

2. The method of claim 1, further comprising storing the unfractionated hydrocarbon liquid mixture in a storage vessel of the recovery system.

3. The method of claim 1, further comprising separating water from the hydrocarbon stream at the wellsite.

4. The method of claim 1, further comprising pressurizing the natural gas at the wellsite.

5. The method of claim 1, further comprising injecting the unfractionated hydrocarbon liquid mixture into the same or a different hydrocarbon bearing reservoir.

6. A method of recovering a fluid, comprising:
receiving a hydrocarbon stream from one or more hydrocarbon bearing reservoirs at a wellsite, wherein the hydrocarbon stream has not been previously injected into the hydrocarbon bearing reservoir;
separating natural gas from the hydrocarbon stream at the wellsite;
separating an unfractionated hydrocarbon liquid mixture from the hydrocarbon stream at the wellsite, wherein the unfractionated hydrocarbon liquid mixture comprises ethane, propane, butane, isobutane, pentane plus, and condensate, and wherein the hydrocarbon stream comprises of at least one of condensate, water, carbon dioxide, and hydrogen sulfide; and
storing the unfractionated hydrocarbon liquid mixture at the wellsite.

7. The method of claim 6, further comprising storing the unfractionated hydrocarbon liquid mixture in a pressurized storage vessel.

8. The method of claim 6, further comprising separating water from the hydrocarbon stream at the wellsite.

9. The method of claim 6, further comprising pressurizing the natural gas at the wellsite.

10. The method of claim 9, further comprising cooling the pressurized natural gas using an aftercooler.

11. The method of claim 9, further comprising cooling a portion of the hydrocarbon stream using the pressurized natural gas.

12. The method of claim 6, further comprising injecting the unfractionated hydrocarbon liquid mixture into the same or a different hydrocarbon bearing reservoir.

13. The method of claim 6, further comprising transporting a separator on a portable skid-frame to the wellsite to separate the unfractionated hydrocarbon liquid mixture from the hydrocarbon stream.

* * * * *